US012604347B2

(12) United States Patent
Wang et al.

(10) Patent No.: US 12,604,347 B2
(45) Date of Patent: Apr. 14, 2026

(54) DATA TRANSMISSION AND RECEPTION TECHNIQUES FOR HANDOVER SCENARIOS

(71) Applicant: ZTE Corporation, Shenzhen (CN)

(72) Inventors: Liping Wang, Shenzhen (CN); Ying Huang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 356 days.

(21) Appl. No.: 17/909,670

(22) PCT Filed: Nov. 9, 2020

(86) PCT No.: PCT/CN2020/127506
§ 371 (c)(1),
(2) Date: Sep. 6, 2022

(87) PCT Pub. No.: WO2021/179649
PCT Pub. Date: Sep. 16, 2021

(65) Prior Publication Data
US 2023/0118291 A1 Apr. 20, 2023

(30) Foreign Application Priority Data
Mar. 9, 2020 (CN) ......................... 202010157407.0

(51) Int. Cl.
*H04W 76/11* (2018.01)
*H04W 76/12* (2018.01)
(Continued)

(52) U.S. Cl.
CPC ............ *H04W 76/12* (2018.02); *H04W 76/11* (2018.02); *H04W 36/0019* (2023.05); *H04W 36/00695* (2023.05); *H04W 36/087* (2023.05)

(58) Field of Classification Search
CPC . H04W 76/11; H04W 76/12; H04W 36/0019; H04W 36/00695; H04W 36/087;
(Continued)

(56) References Cited

U.S. PATENT DOCUMENTS 11,405,830 B2 8/2022 Zhang
2021/0013959 A1 1/2021 Yuan et al.
(Continued)

FOREIGN PATENT DOCUMENTS

CN 107305502 A 10/2017
CN 110149642 A 8/2019
(Continued)

OTHER PUBLICATIONS

OPPO (Discussion on Control Plane for IAB, R2-1809462, Jul. 2018).*
(Continued)

*Primary Examiner* — Lakeram Jangbahadur
(74) *Attorney, Agent, or Firm* — Perkins Coie LLP

(57) ABSTRACT
Provided are a data packet transmission method and apparatus, communication node and medium. The method includes transmitting a handover request message that includes information for a target donor node to forward data; and receiving retransmission data packets forwarded by the target donor node.

18 Claims, 5 Drawing Sheets

(51) Int. Cl.
    *H04W 36/00*        (2009.01)
    *H04W 36/08*        (2009.01)

(58) Field of Classification Search
    CPC . H04W 36/0055; H04W 36/02; H04W 76/22;
                 H04W 84/047; H04W 24/04; H04L
                        1/1607; H04L 1/1806
    See application file for complete search history.

(56) References Cited

U.S. PATENT DOCUMENTS

| | | | |
|---|---|---|---|
| 2021/0168666 A1 | 6/2021 | Li et al. | |
| 2021/0250817 A1 * | 8/2021 | Zou | H04W 36/0016 |
| 2021/0258847 A1 | 8/2021 | Wu et al. | |
| 2022/0141749 A1 * | 5/2022 | Luo | H04W 36/305 |
| | | | 370/331 |
| 2022/0286841 A1 * | 9/2022 | Mildh | H04W 8/26 |
| 2022/0361072 A1 * | 11/2022 | Zhu | H04W 36/0061 |

FOREIGN PATENT DOCUMENTS

| | | | | |
|---|---|---|---|---|
| CN | 110636570 A | 12/2019 | | |
| CN | 110636583 A | 12/2019 | | |
| CN | 110831095 A | 2/2020 | | |
| CN | 111901817 A | 11/2020 | | |
| EP | 2190149 A1 * | 5/2010 | ........... | H04L 1/1829 |
| WO | 2018205949 A1 | 11/2018 | | |
| WO | 2019139524 A1 | 7/2019 | | |
| WO | 2020034909 A1 | 2/2020 | | |

OTHER PUBLICATIONS

European Search Report issued in EP Patent Application No. 20924200.7, dated Jul. 31, 2023, 5 pages.

Potevio, "The mobility in IAB," 3GPP TSG-RAN WG2 Meeting #103, R2-1812673, Gothenburg, Sweden, Aug. 20-24, 2018, 4 pages.

Japanese decision of patent issued in JP Patent Application No. 2022-554714, dated Sep. 5, 2023, 3 pages. English translation included.

Samsung, "Further discussion on intra-donor transport scheme," 3GPP TSG-RAN WG3 Meeting #104, R3-192609, Reno, Nevada, USA, May 13-17, 2019, 4 pages.

CATT, "Summary of offline discussion on IAB Migration same donor case," 3GPP TSG-RAN WG3 #107-e, R3-201148, Feb. 24-Mar. 6, 2020, E-Meeting, 10 pages.

Indian Examination Report issued in IN Patent Application No. 202217052239, dated Mar. 5, 2024, 7 pages.

OPPO, "Discussion on Control Plane for IAB," 3GPP TSG RAN WG2 AH-1807, Montreal, Canada, R2-1809462, 3 pages, Jul. 2-6, 2018.

International Search Report and Written Opinion for International Application No. PCT/CN2020/127506, mailed on Feb. 1, 2021 (9 pages).

Chinese Search Report issued in CN Patent Application No. 2020101574070, dated Jul. 4, 2025, 4 pages. English translation included.

\* cited by examiner

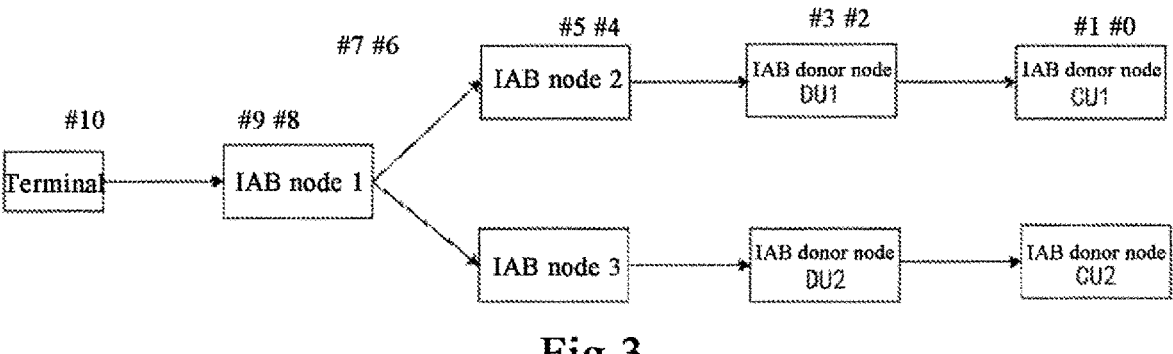

10      #9 #8      #7 #6      #5 #4      #3 #2      #1 #0

Terminal

IAB node 1

IAB node 2

IAB donor node DU1

IAB donor node CU1

IAB node 3

IAB donor node DU2

IAB donor node CU2

Fig.3

Core Network (UPF)

5. Transmit the parsed retransmission data packets to the core network

Source donor node (Source CU)

3. Forward retransmission data packets

4. Transmit parsed retransmission data packets

Target donor node (Target CU)

2. Identify retransmission data packets

1. Forward retransmission data packets

Migrating IAB access node

Fig.4

Receive a handover request message transmitted by a source donor node and retransmission data packets forwarded by a migrating IAB node    210

Forward the retransmission data packets to the source donor node, based on information in the handover request message for a target donor node to forward data    220

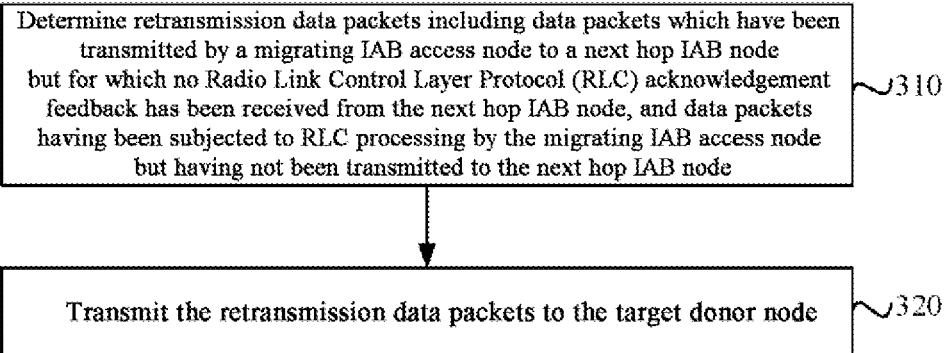

Determine retransmission data packets including data packets which have been
transmitted by a migrating IAB access node to a next hop IAB node
but for which no Radio Link Control Layer Protocol (RLC) acknowledgement
feedback has been received from the next hop IAB node, and data packets
having been subjected to RLC processing by the migrating IAB access node
but having not been transmitted to the next hop IAB node

310

Transmit the retransmission data packets to the target donor node

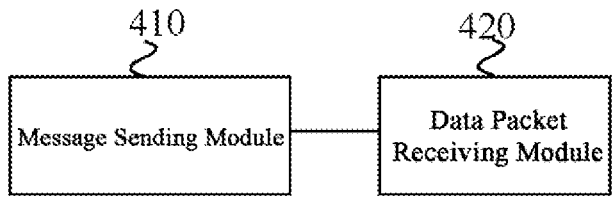

410

420

Message Sending Module

Data Packet
Receiving Module

Fig.8

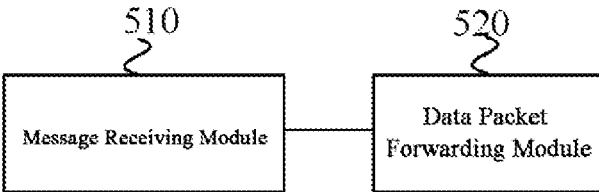

510

520

Message Receiving Module

Data Packet
Forwarding Module

Fig.9

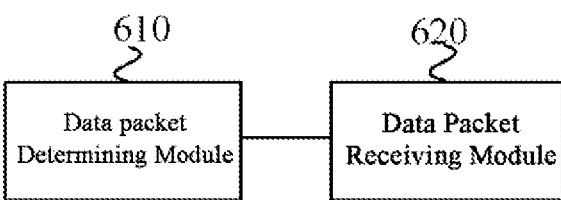

610

620

Data packet
Determining Module

Data Packet
Receiving Module

Fig.10

DATA TRANSMISSION AND RECEPTION TECHNIQUES FOR HANDOVER SCENARIOS

CROSS-REFERENCE TO RELATED APPLICATION

This application a U.S. National Stage Application filed under 35 U.S.C. 371 based on International Patent Application No. PCT/CN2020/127506, filed Nov. 9, 2020, which claims priority to CN patent application No. 202010157407.0, filed with China Patent Office on Mar. 9, 2020, the disclosures of which are incorporated herein in their entireties by reference.

FIELD

Embodiments of the present disclosure generally relate to wireless communication networks, for example, a data packet transmission method and apparatus, communication node and storage medium.

BACKGROUND

An Integrated Access Backhaul (IAB) technology can deploy dense New Radio cells more flexibly through radio backhaul links and relay links. In an IAB scenario, an access node that supports wireless access of a UE and wirelessly backhauls user plane or control plane data is called IAB node, and a access node that provides a radio backhaul function to an IAB node to enable a User Equipment (UE) connection with a core network is called IAB donor node. In an IAB scenario, migration of IAB node is supported. A migrating IAB node may be connected to a plurality of UEs and descendant IAB nodes, and when those UEs and descendant IAB nodes perform handover of the IAB donor node together with the migrating node, packet loss probably occurs.

For example, an IAB node 2 and an IAB node 3 are connected to different donor nodes, respectively, and a migrating IAB node 1 is handed over from the IAB node 2 to the IAB node 3, i.e., it is handed over from a source donor node to a target donor node. When data transmission is interrupted during the handover process, the UE and the IAB node 1 will not perform retransmission for data packets that cannot be correctly received by the IAB node 2, nor will the source donor node and the target donor node process them. As such, packet loss may occur, impacting reliability of the data transmission.

SUMMARY

The present disclosure provides a data packet transmission method, apparatus, communication node and storage medium, to improve reliability of data transmission.

According to embodiments of the present disclosure, there is provided method of data packet transmission applied at a source donor node, including: transmitting a handover request message including information for a target donor node to forward data; and receiving retransmission data packets forwarded by the target donor node.

According to embodiments of the present disclosure, there is provided method of data packet transmission applied at a target donor node, including: receiving a handover request message transmitted by a source donor node and retransmission data packets forwarded by a migrating IAB node; forwarding the retransmission data packets to the source donor node, based on information in the handover request message for the target donor node to forward data.

According to embodiments of the present disclosure, there is provided a method of data packet transmission applied at a migrating Integrated Access Backhaul (IAB) access node, including: determining retransmission data packets including data packets which have been transmitted by a migrating IAB node to a next hop IAB node but for which no Radio Link Control Layer Protocol (RLC) acknowledgement feedback has been received from the next hop IAB node, and data packets having been subjected to RLC processing by the migrating IAB access node but having not been transmitted to the next hop IAB node; and transmitting the retransmission data packets to the target donor node.

According to embodiments of the present disclosure, there is provided an apparatus of data packet transmission, including: a message transmitting module configured to transmit a handover request message including information for a target donor node to forward data; and a data packet receiving module configured to receive data packets forwarded by the target donor node.

According to embodiments of the present disclosure, there is provided an apparatus of data packet transmission, including: a message receiving module configured to receive a handover request message transmitted by a source donor node and retransmission data packets forwarded by a migrating IAB node; and a data packet forwarding module configured to forward the retransmission data packets to the source donor node, based on information in the handover request message for a target donor node to forward data.

According to embodiments of the present disclosure, there is provided an apparatus of data packet transmission, including: a data packet determining module configured to determine retransmission data packets including data packets which have been transmitted by a migrating IAB access node to a next hop IAB node but for which no Radio Link Control Layer Protocol (RLC) acknowledgement feedback has been received from the next hop IAB node, and data packets having been subjected to RLC processing by the migrating IAB access node but having not been transmitted to the next hop IAB node; and a data packet transmitting module configured to transmit the retransmission data packets to a target donor node.

According to embodiments of the present disclosure, there is provided a communication node, including: at least one processor, and a storage device for storing at least one program. The at least one program, when executed by the at least one processor, causes the at least one processor to implement the method of the data packet transmission applied at a source donor node, or the method of the data packet transmission applied at a target donor node, or the method of the data packet transmission applied at a migrating IAB access node.

According to embodiments of the present disclosure, there is provided a computer readable storage medium having computer programs stored thereon, wherein the computer program, when executed by a processor, implements the method of the data packet transmission applied at a source donor node, or the method of the data packet transmission applied at a target donor node, or the method of the data packet transmission applied at a migrating IAB access node.

BRIEF DESCRIPTION OF THE DRAWINGS

FIG. 3 is a schematic diagram of retransmission of data packets according to an embodiment of the present disclosure;

FIG. 4 is a schematic diagram of a data packet transmission process according to an embodiment of the present disclosure;

FIG. 7 is a flowchart of a further data packet transmission method according to an embodiment of the present disclosure;

FIG. 8 is a schematic diagram of a structure of a data packet transmission apparatus according to an embodiment of the present disclosure;

FIG. 9 is a schematic diagram of a structure of another data packet transmission apparatus according to an embodiment of the present disclosure;

FIG. 10 is a schematic diagram of a structure of a further data packet transmission apparatus according to an embodiment of the present disclosure.

DETAILED DESCRIPTION OF EMBODIMENTS

Reference below will be made to the drawings and embodiments to describe the present disclosure. It would be understood that the embodiments described here are merely used to explain the present disclosure, without suggesting any limitation thereto. It is to be noted that embodiments of the present disclosure and features therein can be combined arbitrarily if not conflicted with each other. For ease of description, the drawings only illustrate parts related to the present disclosure, rather than the whole structure.

In an IAB system, a node supporting wireless access of a UE and wirelessly backhauling a user plane or control plane data packet is called IAB node that is included of two parts: a Distributed Unit (DU) logical function (which may also be interpreted as having gNB logical function) and a Mobile Termination (MT) logical function (which may also be interpreted as having UE logical function). A access node that provides a wireless backhaul function to the IAB node to enable a UE connection with a core network is called donor node that includes two parts, a DU and a Centralized Unit (CU), where the CU is formed by a CU-Control Plane (CU-CP) and a CU-User Plane (CU-UP).

Figure 1:
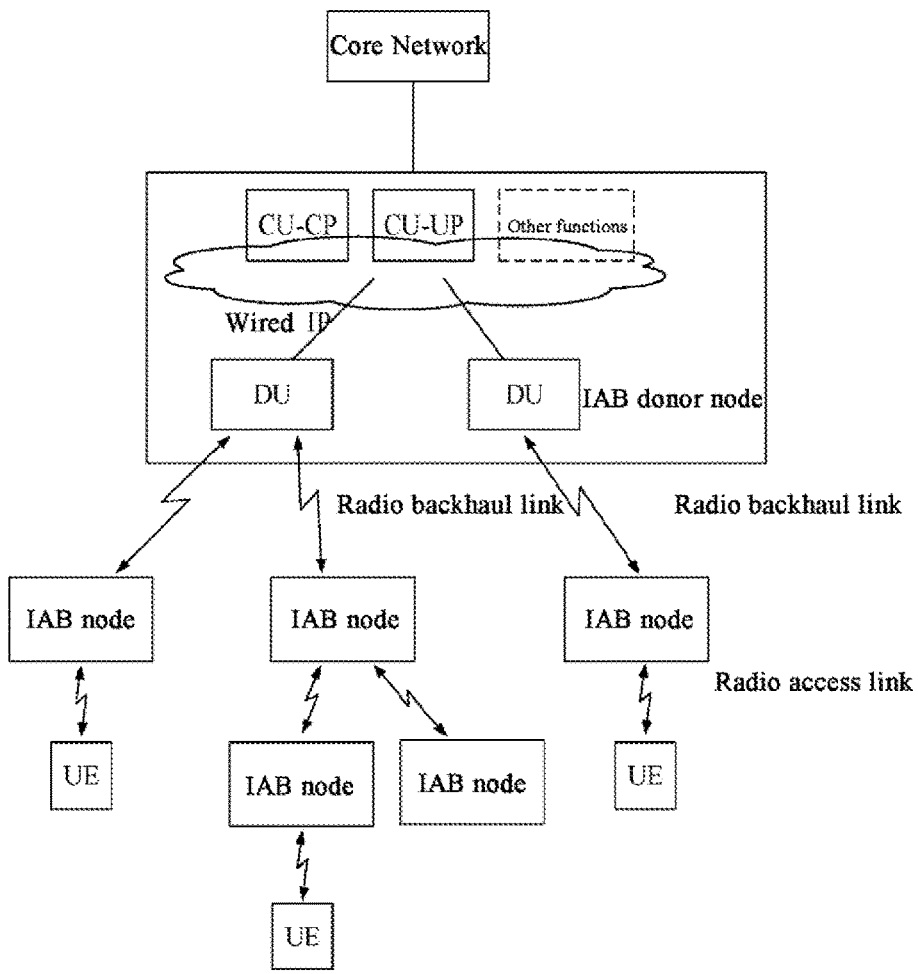
FIG. 1 is a schematic diagram of a basic topological structure in an Integrated Access Backhaul application scenario.

FIG. 1 is a schematic diagram of a basic topological structure in an Integrated Access Backhaul application scenario. As shown therein, the UE accesses an IAB node, and the IAB node can access an IAB donor node, or can access other IAB node (also referred to as parent IAB node) through air interfaces. Data packets of the user plane or control plane can be transmitted between respective nodes via a wireless backhaul link. During that the UE and the IAB node accessed by it perform the handover of the IAB donor node, transmission of some data packets may be interrupted. For data packets that cannot be successfully transmitted over the original path before handover and data packets that cannot be correctly received by the IAB in the original path, the UE and the IAB node will not perform retransmission for those data packets, nor will the original donor node and the IAB donor node receive or process them, resulting in packet loss and impacting reliability of the data transmission.

In the embodiments of the present disclosure, there is provided a data packet transmission method, where a source donor node sends a handover request message to a target donor node at a handover preparation stage, the target donor node can forward the retransmission data packet to the source donor node based on the handover request message, and the retransmission data packets are processed by the source donor node, to solve the problem of packet loss during the path handover, process the retransmission data packets, and improve reliability of data transmission.

Figure 2:
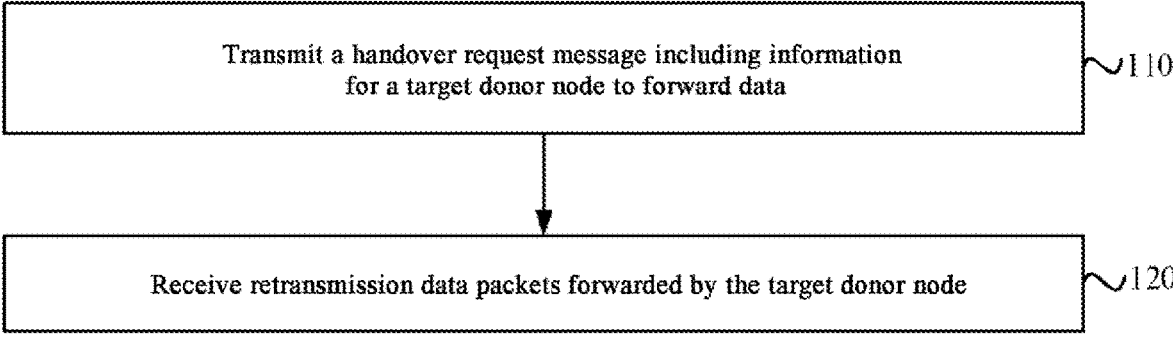
FIG. 2 is a flowchart of a data packet transmission method according to an embodiment of the present disclosure.

FIG. 2 is a flowchart of a data packet transmission method according to an embodiment. The method according to the embodiment is applied to a source donor node. As shown in FIG. 2, the method includes S110 and S120.

At S110, a handover request message is transmitted, which includes information for a target donor node to forward data.

At S120, retransmission data packets forwarded by the target donor node are received.

In the embodiment, by transmitting a handover request message, the source donor node can trigger the target donor node to forward the data packets to the source donor node such that the source donor node can process the retransmission data packets, where a migrating IAB access node accessed by the UE is handed over from an original path to a new path. The retransmission data packets in the present embodiment refer to data packets that are not transmitted by the migrating IAB access node (not subjected to RLC processing), or data packets whose reception is not acknowledged by a next hop parent IAB node of the migrating IAB in the original path, i.e., retransmission data packets forwarded by the migrating IAB access node to the target donor node.

FIG. 3 is a schematic diagram of retransmission of data packets according to an embodiment. As shown in FIG. 3, the UE accesses an IAB node 1 that is connected via a parent node, namely IAB node 2, to a donor node 1. The donor node 1 is included of CU1 and DU1. In the IAB scenario, migration of the IAB node is supported, i.e., the IAB node 1 can be handed over from the IAB node 2 to the IAB node 3, and can be connected via a new parent node, namely IAB node 3, to a new donor node 2. The donor node 2 is included of CU2 and DU2. By this process, donor handover of the IAB node 1 can be implemented. In some embodiments, the IAB node 1 may also be directly connected to the IAB donor node DU1, not passing through the parent node, namely the IAB node 2. Alternatively, the IAB node 1 may be connected to the IAB donor node DU1 via the hop IAB node.

In the IAB scenario, a Hop-by-Hop RLC Automatic Repeat-Request (ARQ) mechanism is supported between adjacent IAB nodes, i.e., after data packets are transmitted from an IAB node to an adjacent next hop IAB node, the RLC layer of the next hop IAB node will feed back an RLC acknowledgement (ACK) to the IAB node that transmitted the data packets if it successfully receives the data packets, and when the IAB node that transmitted the data packets receives the RLC ACK, it is determined that the data packets have been successfully transmitted, and no retransmission should be performed for the data packets.

As shown in FIG. 3, the uplink data packet #0, data packet #1, data packet #2, data packet #3, data packet #4 and data packet #5 of the UE are packets that the UE has transmitted uplink via the IAB node 1 (the migrating IAB access node) on the original path, and data packets for which the RLC layer of the IAB node 2 (a next-hop parent node of the IAB node 1) has fed back an RLC ACK to the IAB node 1. Those data packets can be further uplink forwarded by the IAB node 2 to the IAB donor node CU1 and then transmitted by the CU1 to the core network, or can be forwarded by the IAB donor node CU1 to the IAB donor node CU2 at a handover execution stage and finally successfully transmitted by the IAB donor node CU2 to the core network. Therefore, those data packets will not be lost.

However, the data packet #6 and data packet #7 have been transmitted by the IAB node 1 (i.e., they have been subjected to the RLC processing), but data packets acknowledged by the IAB node 2 have not been received. The data packet #6 and the data packet #7 may have been correctly received by the IAB node 2. In the case, the IAB node 2 continues to uplink forward them to the IAB donor node CU1 and finally to the core network, or upon reception, the IAB donor node CU1 forwards them at the path handover execution stage to the IAB donor node CU2 and finally to the core network. However, due to path handover, the IAB node 1 cannot receive the acknowledgement fed back by the IAB node 2. Retransmission cannot be performed without acknowledgement, and thus the data packet #6 and the data packet #7 may be lost. The data packet #8 and the data packet #9 are data packets that have not been transmitted by the IAB node 1, namely data packets that have not been subjected to the RLC process. The data packet #10 is a data packet that has not been transmitted by the UE. The data packet #6, data packet #7, data packet #8 and data packet #9 are data packets belonging to UE Data Radio Bearer (DRB) UL on-flight, i.e., the retransmission data packets according to the embodiment. For the UE, this type of data packets has been received by the IAB node 1, and the RLC layer of the IAB node 1 has fed an RLC ACK back to the UE. Therefore, the UE determines that the retransmission data packets (data packet #6, data packet #7, data packet #8 and data packet #9) have been successfully received and should not be retransmitted. However, the retransmission data packets are not the data packets of the IAB node 1 itself, which are not processed or cached by the Packet Data Convergence Protocol (PDCP) of the IAB node 1. In the case, the IAB node 1 will not perform retransmission for the type of data packets, thus causing packet loss.

In the data packet transmission method according to the embodiment, the source donor node can instruct at a handover preparation stage, via a handover request message, the target donor node to forward Xn interface data and provide forwarding path information. Then, in the handover process, the migrating IAB access node reroutes the retransmission data packets to the target donor node, and the target donor node forwards the type of data packets to the source donor node via an Xn interface. After receiving and processing the retransmission data packets, the source donor node forwards them to the target donor node via a data forwarding process of the path handover. Finally, the target donor node sends the retransmission data packets to the core network.

FIG. 4 is a schematic diagram of a data transmission process according to an embodiment. A migrating IAB access node and child IAB nodes thereof, together with a UE accessed via the migrating IAB access node and child IAB nodes, constitute a handover group for donor node handover (or path handover), which can hand over the path from the source donor node path to the target donor node path. Upon receiving a Radio Resource Control (RRC) reconfiguration message transmitted by the source donor node CU, the handover group stops receiving/transmitting data from/to the source donor node, accesses to the target donor node from a new path, and starts data interaction with the core network via the target donor node. In the process, due to the specific feedback mechanism of the IAB (Hop-by-Hop ARQ), UL on-flight data packets of UL DRBs belonging to the handover group may be lost. In order to guarantee a lossless handover, the handover group reroutes the retransmission data packets of UL on-flight of the handover group on the original path prior to interacting with the target donor node for new data. As shown in FIG. 4, the process involves the following:

S1: the migrating IAB access node retransmits data packets to be transmitted to the target CU.

S2: the target CU reads the retransmission data packets and identifies that the retransmission data packets are uplink data packets that have not been transmitted successfully by the UE and need to be forwarded to the source CU.

S3: the target CU forwards the retransmission data packets to the source CU via an Xn-U interface.

S4: upon receiving the retransmission data packets, the source CU performs PDCP layer parsing and forwards the parsed retransmission data packets to the target CU.

S5: the target CU transmits the parsed retransmission data packets to a core network User Plane Function (UPF) via an NG interface.

In the data packet transmission method according to the embodiment, prior to S1 as mentioned above, by transmitting a handover request message, the source donor node can trigger the target donor node to forward the retransmission data packets to the source donor node in the handover process such that the source donor node can process the retransmission data packets. In this way, the present disclosure can avoid loss of retransmission data packets resulting from path handover performed by the migrating IAB access node, and implement a lossless handover.

In an embodiment, a destination Backhaul Adaptation Protocol (BAP) address of the retransmitted retransmission data packets is modified by the migrating IAB access node to a BAP address of the target donor node; or the destination BAP address of the retransmitted retransmission data packets is modified to a BAP address of the source donor node.

In an embodiment, a routing table of IAB nodes on the target path through which the retransmission data packets pass and a routing table of the target donor node are configured by the target donor node; the respective routing tables include a BAP address of the source donor node and a BAP address of a corresponding next hop node.

As for S1, the destination BAP address in the BAP header of the retransmission data packets is a source CU or source DU; and in the new path after handover, the destination BAP address in the BAP header of the new uplink data packets is a target CU or target DU, i.e., a default destination of the data packets on the new path is the target CU, and the respective IAB nodes on the new path can only identify data packets whose destination BAP address in the BAP header is the target CU or target DU. In the present embodiment, the following three solutions are employed to support transmission of retransmission data packets over a new path to the target CU:

Solution 1: a BAP sub-header of the retransmission data packets of the handover group is modified by the migrating IAB access node, and the destination BAP address is modified to a BAP address of the target CU or target DU, such that the retransmission data packets can be identified by each IAB node over the new path and finally transmitted to the target CU.

Solution 2: the migrating IAB access node does not modify the destination BAP address of the BAP sub-header of the retransmission data packets of the handover group; when the retransmission data packets are transmitted over the new path, each IAB node on the new path cannot identify the destination BAP address of the retransmitted retransmission data packets, nor can an egress link be searched through the routing table; in the case, the respective IAB nodes can select any one path for transmitting the retransmission data packets such that the retransmission data packets can arrive at the target CU.

Solution 3: the BAP sub-header of the retransmission data packets of the handover group is not modified, and the target CU configures a routing table for respective IAB nodes through which the retransmission data packets of the handover group pass on the new path. Table 1 is a routing table corresponding to IAB nodes along a target path. As shown in Table 1, the routing table includes a BAP address of the source CU or source DU and a corresponding next hop. In some embodiments, the above routing table is configured temporarily for rerouting retransmission data packets, and can be deleted after completion of the path handover.

TABLE 1

| Routing table corresponding to IAB nodes on target path | |
| --- | --- |
| destination BAP address | next hop (BAP address) |
| address of BAP of source CU or source DU | IAB nodes or target CU on new path |

In an embodiment, information for the target donor node to forward data includes a BAP address of the source donor node.

In the embodiment, the source CU sends, in the handover request message, the BAP address of the source donor node (source CU or source DU) to the target CU at the handover preparation stage, and the target CU can configure the above routing table after acquiring the BAP address of the source CU or source DU.

In an embodiment, the information for the target donor node to forward data includes Transport Layer Information (TNL) information of an F1-U interface and a Data Radio Bearer (DRB) identifier; the TNL information includes at least one of the following: a transport layer IP address; and a General Packet Radio Service Tunneling Protocol-Tunnel Endpoint Identifier (GTP-TEID); the transport layer IP address is an IP address of the source donor node or migrating IAB node; the GTP-TEID is allocated by the source donor node or the migrating IAB access node; the transport layer IP address is allocated by the source donor node or the migrating IAB access node.

As for S2: in the normal condition, the target CU identifies a UE-DRB to which data packets belong based on uplink TNL information carried in a data packet sub-header, so as to identify the data packets and determine a receiving and forwarding path of the data packets. Table 2 relates to a structure of TNL information. As shown in Table 2, TNL information is used to uniquely define transport pipeline information of DRB of an F1-U transmission between gNB-CU and gNB-DU, including a transport layer IP address and a GTP-TEID. The transport layer IP address denotes an IP address in the F1-U transmission, and the GTP-TEID denotes a GTP tunnel endpoint ID in the F1-U transmission.

TABLE 2

| Structure of TNL information | |
| --- | --- |
| TNL information | |
| GTP tunnel | |
| transport layer IP address | IP Address |
| GTP-TEID | GTP tunnel endpoint identifier |

In the embodiment, the transport layer IP address contained in the TNL information carried in the retransmission data packet sub-headers is an IP address of the source CU, and the GTP-TEID contained therein is a GTP tunnel endpoint identifier allocated by the source CU for the UE-DRB to which the retransmission data packets belong, i.e., the target CU cannot identify the TNL information carried in the rerouted retransmission data packet sub-headers, making it impossible to correctly receive or forward those data packets. In the present embodiment, the following solutions are employed to allow the target CU to successfully identify the retransmission data packets:

Solution 1: at the handover preparation stage, the source CU sends in the handover request message, to the target CU, F1-U interface tunnel identification information allocated by the source CU for each DRB in the handover group, namely the transport layer IP address or GTP-TEID in the TNL information.

Solution 2: the source CU sends, to the target CU, F1-U interface tunnel identification information allocated by the migrating IAB access node DU end (or the DU end acting as an access IAB node in the handover group) for each DRB in the handover group, namely the transport layer IP address or GTP-TEID in the TNL information.

In an embodiment, information for the target donor node to forward data includes forwarding tunnel information of the Xn-U interface; the forwarding tunnel information meets at least one of the following: if granularity of the forwarding tunnel information is a UE-Data Radio Bearer (UE-DRB), the forwarding tunnel information includes a transport layer IP address, a GTP-TEID and a DRB identifier; if granularity of the forwarding tunnel information is an F-1-U IP, the forwarding tunnel information includes a transport IP address and a GTP-TEID; and if granularity of the forwarding tunnel information is a base station gNB, the forwarding tunnel information includes a transport layer IP address and a GTP-TEID.

As for S3, the target CU does not have Xn-U (a data transmission interface between the source CU and the target CU) forwarding GTP-U tunnel information (i.e., TNL information of the Xn-U of the retransmission data packets) to the source CU. In the present embodiment, the following solutions are employed to support data forwarding from a target side to a source side:

Solution 1: at the handover preparation stage, the source CU provides the target CU with forwarding tunnel information of TNL information of the Xn-U with a UE-DRB as granularity in the handover request message or XN-U address indication message, where the transport layer IP address is an IP address of the Xn-U allocated by the source CU, the GTP-TEID is a GTP tunnel endpoint ID and a DRB ID on the Xn-U allocated by the source CU. Upon receiving the rerouted retransmission data packets, the target CU parses them and transmits the retransmission data packets with a DRB as granularity over an Xn-U tunnel with a UE-DRB as granularity provided by the source CU.

Solution 2: at the handover preparation stage, the source CU provides the target CU with forwarding tunnel information of TNL information of the Xn-U with an F-1-U IP as granularity in the handover request message or XN-U Address Indication message, where the transport layer IP address is an IP address of the Xn-U allocated by the source CU, and the GTP-TEID is a GTP tunnel endpoint ID on the Xn-U allocated by the source CU. Upon receiving the rerouted retransmission data packets, the target CU parses them and then transmits the retransmission data packets with an F-1-U IP as granularity over the Xn-U tunnel with an F-1-U IP as granularity provided by the source CU.

Solution 3: at the handover preparation stage, the source CU provides the target CU with forwarding tunnel information of TNL information of the Xn-U with a gNB as granularity in the handover request message or XN-U Address Indication message, i.e., there is only one piece of tunnel forwarding information of the TNL information of the Xn-U, where the transport layer IP address is an IP address of the Xn-U allocated by the source CU, and the GTP-TEID is a GTP tunnel endpoint ID on the Xn-U allocated by the source CU. Upon receiving the rerouted retransmission data packets, the target CU parses them and then transmits the retransmission data packets with a gNB as granularity over the Xn-U tunnel with a gNB as granularity provided by the source CU.

In an embodiment, the information for the target donor node to forward data includes IP routing forwarding indication message and a routing forwarding table.

In the embodiment, at the handover preparation stage, the source CU indicates an IP routing indication message and a routing forwarding table in the handover request message or XN-U Address Indication message. Table 3 is an IP routing forwarding table. As shown in Table 3, upon receiving the rerouted retransmission data packets, the target CU parses them and reads a target IP address (here, the IP address in the retransmission data packets is an F1-U IP of the source CU), and then searches the IP routing forwarding table to obtain that the next hop is an Xn-U IP of the source CU. The target CU performs Xn-U path forwarding for the retransmission data packets with the IP as granularity.

TABLE 3

| IP routing forwarding table | |
|---|---|
| IP address of retransmission data packets | Next hop IP address |
| F1-U IP of source CU | Xn-U IP of source CU |

In addition, at S4, in the handover preparation stage, the source CU can instruct, in the handover request message, the target CU to perform forwarding processing for the retransmission data packets.

In an embodiment, information for the target donor node to forward data includes first indication information indicating the target donor node to receive the retransmission data packets forwarded by the migrating IAB access node.

In the embodiment, information for the target donor node to forward data includes first indication information, based on which the target donor node receives the retransmitted data packets rerouted by the migrating IAB access node.

In an embodiment, the information for the target donor node to forward data includes second indication information indicating the target donor node to forward the retransmission data packets to the source donor node.

In the embodiment, the handover request message includes the second indication information, based on which the target donor node forwards the rerouted retransmission data packets to the source donor node.

In an embodiment, the information for the target donor node to forward data includes third indication information for notifying the target donor node to instruct the migrating IAB access node to forward the retransmission data packets. For example, upon receiving the third indication information, the target donor node can transmit fourth indication information to the migrating IAB access node, and upon receiving the fourth indication information, the migrating IAB node transmits the retransmission data packets to the target donor node.

Figures 5, 6:
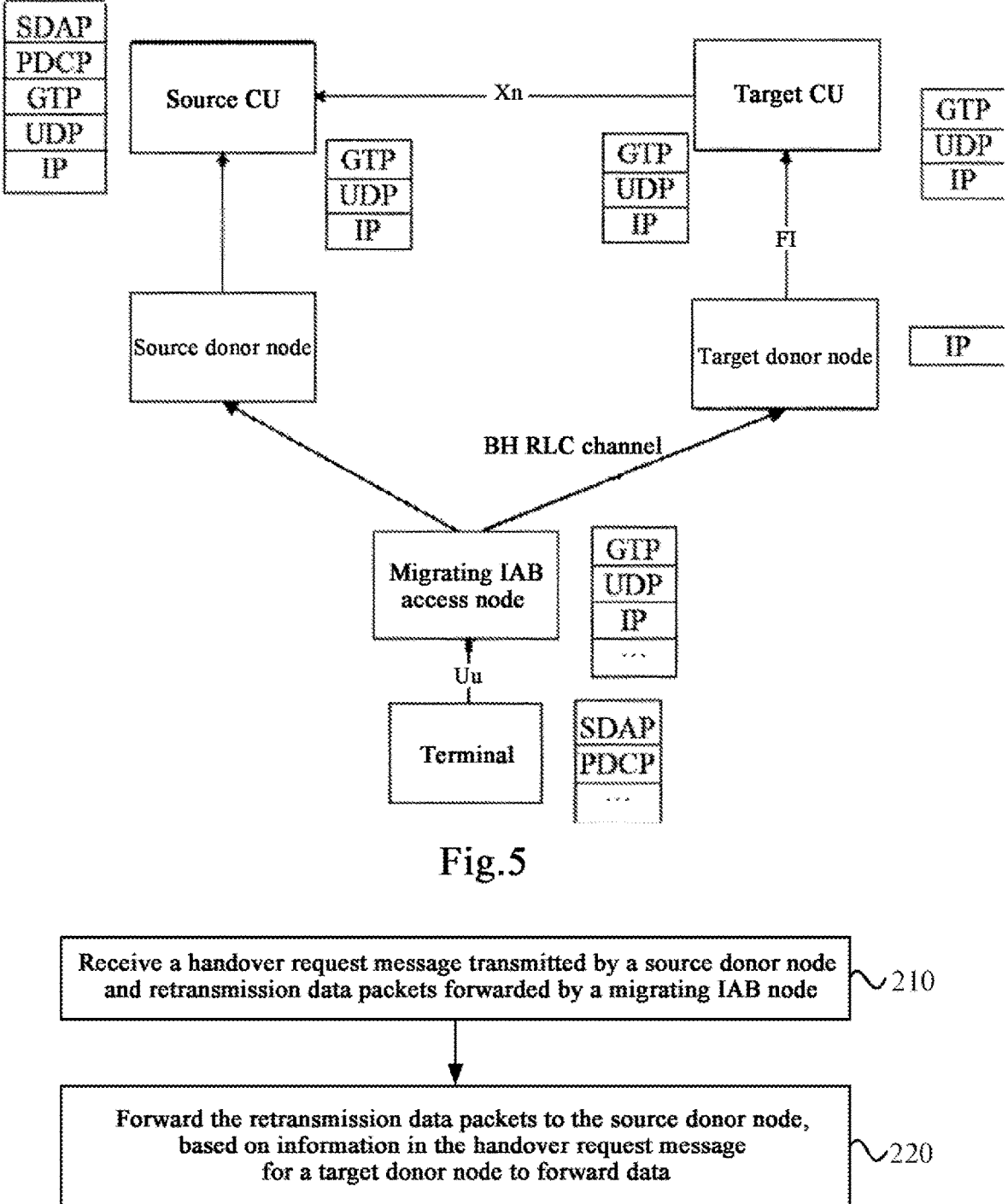
FIG. 5 is a schematic diagram of information carried by respective nodes in a data packet transmission process according to an embodiment of the present disclosure.
FIG. 6 is a flowchart of another data packet transmission method according to an embodiment of the present disclosure.

FIG. 5 is a schematic diagram of information carried in respective nodes in a data packet transmission process according to an embodiment. The IP address of the F1-U link GTP tunnel of the retransmission data packets of the UE is an IP address of the source CU, and TEIDs at two ends of the F1-U link GTP-U tunnel of the retransmission data packets of the UE are allocated by entities at the two ends of the F1-U, respectively, i.e., they are allocated by the source CU and the migrating IAB access node DU (i.e., the DU portion of the IAB access node of the UE).

In the data packet transmission method according to the embodiment, the source donor node transmits information for the target donor node to forward data in the handover request message, to instruct the target donor node to correctly transmit the retransmission data packets to the source donor node for parsing and processing by the source donor node, so as to avoid packet loss.

According to an embodiment of the present disclosure, there is provided a data packet transmission method applied to a target donor node. In the embodiment, operations performed by the target donor node correspond to those performed by the source donor node (see any one of the embodiments described above for technical details not described here).

FIG. 6 is a flowchart of another data packet transmission method according to an embodiment. As shown in FIG. 6, the method according to the embodiment includes S210 and S220.

At S210, a handover request message transmitted by the source donor node and retransmission data packets forwarded by the mobile IAB node are received.

At S220, the retransmission data packets are forwarded to the source donor node based on information in the handover request message for the target donor node to forward data.

In an embodiment, the information for the target donor node to forward data includes TNL information of an F1-U interface and a DRB identifier.

The TNL information includes at least one of the following: a transport layer IP address; and a GTP-TEID.

The transport layer IP address is an IP address of the source donor node or migrating IAB access node.

The GTP-TEID is allocated by the source donor node or the migrating IAB access node.

The transport layer IP address is allocated by the source donor node or the migrating IAB access node.

In an embodiment, the information for the target donor node to forward data includes forwarding tunnel information of an Xn-U interface; if granularity of the forwarding tunnel information is a UE-DRB, the forwarding tunnel information includes a transport layer IP address, a GTP-TEID and a DRB identifier; if granularity of the forwarding tunnel information is an F-1-U IP, the forwarding tunnel information includes a transport layer IP address and a GTP-TEID;

if granularity of the forwarding tunnel information is a gNB, the forwarding tunnel information includes a transport layer IP address and a GTP-TEID.

In an embodiment, the handover request message includes an IP routing forwarding indication message and a routing forwarding table.

In an embodiment, the information for the target donor node to forward data includes first indication information;

The handover request message transmitted by the source donor node and the retransmission data packets forwarded by the migrating IAB node include: when the first indication information is received, receiving retransmission data packets transmitted by a migrating IAB access node.

In an embodiment, the information for the target donor node to forward data includes second indication information;

Forwarding the retransmission data packets to the source donor node based on the information in the handover request message for the target donor node to forward data, includes: when the second indication information is received, forwarding the retransmission data packets to the source donor node.

In an embodiment, the information for the target donor node to forward data includes third indication information, and the method further includes: when the third indication information is received, transmitting fourth indication information to the migrating IAB access node indicating the migrating IAB access node to forward the retransmission data packets to the target donor node.

In an embodiment, the information for the target donor node to forward data includes a BAP address of the source donor node.

In an embodiment, the method further includes: configuring a routing table of IAB nodes along a target path through which the retransmission data packets pass and a routing table of the target donor node; a BAP address of the source donor node and a BAP address of a corresponding next hop node are included in the respective routing tables.

In the data packet transmission method according to the embodiment, by receiving the handover request message, the target donor node can correctly transmit, based on the handover request message, the retransmission data packets to the source donor node for the parsing processing by the source donor node, so as to avoid packet loss and improve reliability of the data transmission.

According to an embodiment of the present disclosure, there is provided a data packet transmission method applied to a migrating IAB node. In the embodiment, the operations performed by the migrating IAB access node correspond to those performed by the source donor node or target donor node according to the above embodiments (see any one of the above embodiments for technical details not described here).

FIG. 7 is a flowchart of a further data packet transmission method according to an embodiment. As shown in FIG. 7, the method according to the embodiment includes S310 and S320.

At S310, retransmission data packets are determined, the retransmission data packets including data packets which have been transmitted by the migrating IAB access node to a next hop IAB node but for which no Radio Link Control Layer Protocol (RLC) acknowledgement feedback has been received from the next hop IAB node, and data packets having been subjected to RLC processing by the migrating IAB access node but having not been transmitted to the next hop IAB node.

At S320, the retransmission data packets are transmitted to the target donor node.

In an embodiment, the method further includes: modifying a BAP address of the retransmitted retransmission data packets to a BAP address of the target donor node.

In the data packet transmission method according to the present embodiment, the migrating IAB access node reroutes the retransmission data packets to the target donor node for subsequent processing by the target donor node and the source donor node, to avoid packet loss and improve the reliability of the data transmission.

According to an embodiment of the present disclosure, there is provided a data packet transmission apparatus. FIG. 8 is a structural diagram of a data packet transmission apparatus according to an embodiment. As shown therein, the data packet transmission apparatus includes: a message transmitting module 410 and a data packet receiving module 420.

The message transmitting module 410 is configured to transmit a handover request message that includes information for the target donor node to forward data.

The data packet receiving module 420 is configured to receive retransmission data packets forwarded by the target donor node.

The data packet transmission apparatus according to the embodiment can solve the packet loss problem in the path handover process, implement processing of retransmission data packets and improve reliability of the data transmission in the following manner: the handover request message is transmitted to the target donor node at the handover preparation stage, the target donor can forward the retransmission data packets to the source donor node based on the handover request message, and the retransmission data packets are then processed by the source donor node.

In an embodiment, the information for the target donor node to forward data includes Transport Network Layer (TNL) information of an F1-U interface and a Data Radio Bearer (DRB) identifier; the TNL information includes at least one of the following: a transport layer IP address; and a General Packet Radio Service Tunneling Protocol-Tunnel Endpoint Identifier (GTP-TEID); the transport layer IP address is an IP address of a source donor node or migrating IAB access node; the GTP-TEID is allocated by the source donor node or the migrating IAB access node; the transport layer IP address is allocated by the source donor node or the migrating IAB access node.

In an embodiment, the information for the target donor node to forward data includes forwarding tunnel information of an Xn-U interface; the forwarding tunnel information meets at least one of the following: if granularity of the forwarding tunnel information is a User equipment Data Radio Bearer (UE-DRB), the forwarding tunnel information includes a transport layer IP address, a GTP-TEID and a DRB identifier; if granularity of the forwarding tunnel information is an F-1-U IP, the forwarding tunnel information includes a transport layer IP address and a GTP-TEID; if granularity of the forwarding tunnel information is a base station gNB, the forwarding tunnel information includes a transport IP address and a GTP-TEID.

In an embodiment, the information for the target donor node to forward data includes an IP routing forwarding indication message and a routing forwarding table.

In an embodiment, the information for the target donor node to forward data includes first indication information indicating the target donor node to receive retransmission data packets forwarded by the migrating IAB access node.

In an embodiment, the information for the target donor node to forward data includes second indication information indicating the target donor node to forward the retransmission data packets to the source donor node.

In an embodiment, the information for the target donor node to forward data includes third indication information for notifying the target donor node to instruct the migrating IAB node to forward the retransmission data packets.

The method further includes: when fourth indication information is received, forwarding the retransmission data packets to the target donor node.

In an embodiment, the information for the target donor node to forward data includes a Backhaul Adaptation Protocol (BAP) address of the source donor node.

The data packet transmission apparatus according to the embodiment and the data packet transmission method applied to a source donor node according to the above embodiment belong to the same invention conception (see any one of the above embodiments for technical details not described here), and the present embodiment has the same advantageous effect as the transmission method.

According to embodiments of the present disclosure, there is provided a data packet transmission apparatus. FIG. 9 is a schematic structural diagram of another data packet transmission apparatus according to an embodiment. As shown in FIG. 9, the data packet transmission apparatus includes: a message receiving module 510 and a data packet forwarding module 520.

The message receiving module 510 is configured to receive a handover request message transmitted by a source donor node and retransmission data packets forwarded by a migrating IAB node.

The data packet forwarding module 520 is configured to forward the retransmission data packets to the source donor node based on information in the handover request message for the target donor node to forward data.

The data packet transmission method according to the embodiment includes: receiving a handover request message, correctly transmitting the retransmission data packets to the source donor node based on the handover request message, for parsing processing by the source donor node, so as to avoid packet loss and improve reliability of data transmission.

In an embodiment, the information for the target donor node to forward data includes TNL information of an F1-U interface and a DRB identifier; the TNL information includes at least one of the following: a transport layer IP address; and a GTP-TEID; the transport layer IP address is an IP address of a source donor node or migrating IAB access node; the GTP-TEID is allocated by the source donor node or migrating IAB access node; the transport layer IP address is allocated by the source donor node or migrating IAB access node.

In an embodiment, the information for the target donor node to forward data includes forwarding tunnel information of an Xn-U interface; the forwarding tunnel information meets at least one of the following: if granularity of the forwarding tunnel information is a UE-DRB, the forwarding tunnel information includes a transport layer IP address, a GTP-TEID and a DRB identifier; if granularity of the forwarding tunnel information is an F-1-U IP, the forwarding tunnel information includes a transport layer IP address and a GTP-TEID; if granularity of the forwarding tunnel information is a gNB, the forwarding tunnel information includes a transport layer IP address and a GTP-TEID.

In an embodiment, the handover request message includes an IP routing forwarding indication message and a routing forwarding table.

In an embodiment, the information for the target donor node to forward data includes first indication information, and the message receiving module 510 includes the data packet acquiring module; the data packet acquiring module is configured to receive retransmission data packets transmitted by the migrating IAB access node when the first indication information is received.

In an embodiment, the information for the target donor node to forward data includes second indication information; the data packet forwarding module 220 is specifically configured to: forward the retransmission data packets to the source donor node when the second indication information is received.

In an embodiment, the information for the target donor node to forward data includes third indication information for notifying the target donor node to instruct the migrating IAB access node to forward the retransmission data packets. For example, upon receiving the third indication information, the target donor node can transmit fourth indication information to the migrating IAB access node, and upon receiving the fourth indication information, the migrating IAB node sends the retransmission data packets to the target donor node.

In an embodiment, the information for the target donor node to forward data includes a BAP address of the source donor node.

In an embodiment, the apparatus further includes: a routing table configuring table is provided to configure a routing table of IAB nodes along a target path through which the retransmission data packets pass and a routing table of the target donor node; a BAP address of the source donor node and a BAP address of a corresponding next hop node are included in the respective routing tables.

The data packet transmission apparatus according to the embodiment and the data packet transmission method applied to a source donor node according to the above embodiment belong to the same invention conception (see any one of the above embodiments for technical details not described here), and the present embodiment has the same advantageous effect as the transmission method.

According to embodiments of the present disclosure, there is provided a data packet transmission apparatus. FIG. 10 is a schematic structural diagram of a further data packet transmission apparatus according to an embodiment. As shown in FIG. 10, the data packet transmission apparatus includes: a data packet determining module 610 and a data packet transmitting module 620.

The data packet determining module 610 is configured to determine retransmission data packets, the retransmission data packets including data packets which have been transmitted by the migrating IAB node to a next hop IAB node but for which no Radio Link Control Layer Protocol (RLC) acknowledgement feedback has been received from the next hop IAB node, and data packets having been subjected to RLC processing by the migrating IAB access node but having not been transmitted to the next hop IAB node.

The data packet transmitting module 620 is configured to transmit the retransmission data packets to the target donor node.

The data transmission apparatus according to the embodiment reroutes the retransmission data packets to the target donor node for subsequent processing by the target donor node and the source donor node, so as to avoid packet loss and improve the reliability of the data transmission.

In an embodiment, the apparatus further includes: a modifying module configured to modify a destination BAP address of the retransmitted retransmission data packets to a BAP address of the target donor node.

The data packet transmission apparatus according to the embodiment and the data packet transmission method applied to a migrating IAB donor node according to the above embodiment belong to the same invention conception (see any one of the above embodiments for technical details not described here), and the present embodiment has the same advantageous effect as the transmission method.

According to embodiments of the present disclosure, there is provided a communication node. The data packet transmission method can be performed by a data packet transmission apparatus, and the data packet transmission apparatus can be implemented by software and/or hardware in turn and integrated in the communication node. The communication node is a migrating IAB node, source donor node or target donor node.

Figure 11:
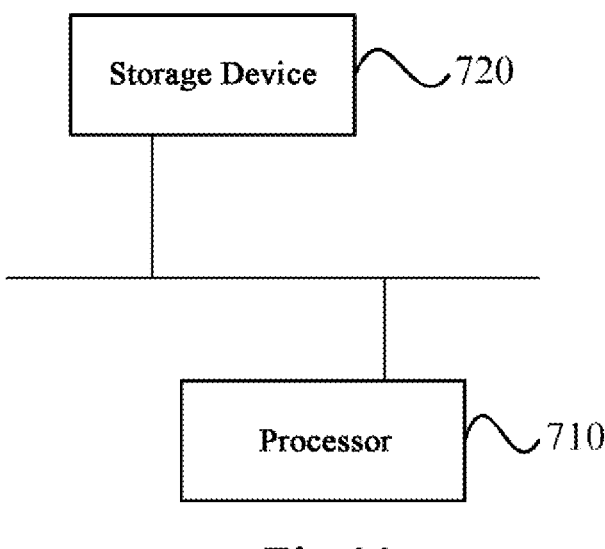
FIG. 11 is a schematic diagram of a hardware structure of a communication node according to an embodiment of the present disclosure.

FIG. 11 is a schematic diagram of a hardware structure of a communication node. As shown in FIG. 11, there is provided a communication node according to the embodiment, including: a processor 710 and a storage device 720. The processor in the communication node may be provided in one or a plural number, and one processor 710 is taken as an example in FIG. 11. The processor 710 and the storage device 720 in the apparatus can be connected via a bus or in other forms, and a bus connection is taken as an example in FIG. 11.

The one or more programs are executed by the one or more processors 710 to cause the one or more processors to implement the data packet transmission method according to any one of the above embodiments.

The storage device 720 in the communication node, as a computer readable storage medium, is used to store one or more programs which may be software programs, computer executable programs and modules, for example, program instructions/modules corresponding to the data packet transmission method according to the embodiments of the present disclosure (e.g., the modules in the data packet transmission apparatus as shown in FIG. 8, including: a message transmitting module 410 and a data packet receiving module 420). By running software programs, instructions and modules stored in the storage device 720, the processor 710 executes various functional applications and data processing of the communication node, i.e., it implements the data packet transmission method according to the above method embodiments.

The storage device 720 mainly includes a program storage zone and a data storage zone, where the program storage zone can store an operating system and application programs required by at least one function; the data storage zone can store data created according to the use of the apparatus (e.g. information for a target donor node to forward data, a handover request message, and the like). In addition, the storage device 720 can include a high speed random access memory, or may include a non-volatile memory, such as at least one disk storage device, a flash memory device, or other non-volatile solid state storage device. In some embodiments, the storage device 720 can further include memories disposed remotely relative to the processor 710, and those remote memories can be connected to the device via a network connection. Examples of the network include, but are not limited to, an internet, an intranet, a local area network, a mobile communication network, and a combination thereof.

If the communication node is a source donor node, when one or more programs therein are executed by the one or more processors 710, the following operations are implemented: transmitting a handover request message including information for a target donor node to forward data; and receiving retransmission data packets forwarded by the target donor node.

If the communication node is a target donor node, when one or more programs therein are executed by the one or more processors 710, the following operations are implemented: receiving a handover request message transmitted by the source donor node and retransmission data packets forwarded by a migrating IAB node; and forwarding the retransmission data to the source donor node based on the information in the handover request message for the target donor node to forward data.

If the communication node is a migrating IAB access node, when one or more programs included therein are executed by the one or more processors 710, the following operations are implemented: determining retransmission data packets, the retransmission data packets including data packets which have been transmitted by the migrating IAB node to a next hop IAB node but for which no Radio Link Control Layer Protocol (RLC) acknowledgement feedback has been received from the next hop IAB node, and data packets having been subjected to RLC processing by the migrating IAB access node but having not been transmitted to the next hop IAB node; transmitting the retransmission data packets to the target donor node.

The communication node according to the embodiment and the data packet transmission method according to the above embodiment belong to the same invention conception (see any one of the above embodiments for technical details not described here), and the present embodiment has the same advantageous effect as the transmission method.

According to embodiments of the present disclosure, there is further provided a storage medium including computer executable instructions, the computer executable instructions when executed by a computer processor to perform a data packet transmission method applied to a source donor node, target donor node or migrating IAB access node.

Through the above description on the implementations, those skilled in the art would learn that the present disclosure can be implemented by means of software and general hardware, or can be implemented by hardware only. In the case, the technical solution according to the present disclosure can be embodied in the form of software product, and the computer software product may be stored in a computer readable storage medium, such as a computer floppy disk, a Read-Only Memory (ROM), a Random Access Memory (RAM), a flash, a hard disk or optical disk, or the like, and includes a plurality of instructions to cause a computer device (which may be a personal computer, server, network device or the like) to perform the method according to any one of the embodiments of the present disclosure.

The descriptions above only relates to example embodiments of the present disclosure, without suggesting limitation to the protection scope thereof.

Any one of the block diagrams of logic flowcharts in the drawings may represent program steps, or may represent logic circuits, modules and functions interconnected to one another, or may represent a combination of program steps with logic circuits, modules and functions. Computer programs can be stored on the memory that can be of any suitable type for a local technical environment and can be implemented using any appropriate data storage technique, including, but not limited to, a Read-Only Memory (ROM), a Random Access Memory (RAM), an optical storage device and system (Digital Video Disc (DVD) or Compact Disk (CD)), and the like. The computer readable medium may cover a non-transient storage medium. The data processor may be any suitable type for a local technical environment, including, but not limited to, a general computer, a dedicated computer, a microprocessor, a Digital Signal Processing (DSP), an Application Specific Integrated Circuit (ASIC), a Field-Programmable Gate Array (FPGA), and a multi-core processor architecture-based processor.

The foregoing has provided a detailed description of example embodiments of the present disclosure in an illustrative, non-limiting way. With reference to the drawings and the appended claims, various modifications and variations to the above embodiments are apparent to those skilled in the art, without departing from the scope of the present disclosure. Therefore, the appropriate scope of the present disclosure is dependent on the appended claims below.

We claim:

1. A method of data packet transmission, comprising:
transmitting, by a source donor node to a target donor node, a handover request message comprising information for the target donor node to forward data; and
receiving, by the source donor node, rerouted data packets forwarded by the target donor node, wherein the rerouted data packets are sent from an Integrated Access Backhaul (IAB) node to the target donor node, and the rerouted data packets are forwarded by the target donor node based on the information in the handover request message for the target donor node to forward data;
wherein the information for the target donor node to forward the data comprises Transport Network Layer (TNL) information of an F1-U interface,
the TNL information comprises a transport layer IP address,
the transport layer IP address is an IP address of the IAB node, and
the transport layer IP address is allocated by the source donor node.

2. The method of claim 1, wherein the information for the target donor node to forward the data comprises forwarding tunnel information of an Xn-U interface,
the forwarding tunnel information meets at least one of the following:
if granularity of the forwarding tunnel information is User Equipment Data Radio Bearers (UE-DRBs), the forwarding tunnel information comprises a transport layer IP address, a GTP-TEID and a DRB identifier,
if the granularity of the forwarding tunnel information is F-1-U IPs, the forwarding tunnel information comprises a transport layer IP address and a GTP-TEID, and
if the granularity of the forwarding tunnel information is gNBs, the forwarding tunnel information comprises a transport layer IP address and a GTP-TEID.

3. The method of claim 1, wherein the information for the target donor node to forward the data comprises an IP routing forwarding indication message and a routing forwarding table; or
wherein the information for the target donor node to forward the data comprises a Backhaul Adaption Protocol (BAP) address of the source donor node.

4. The method of claim 1, wherein the information for the target donor node to forward the data comprises first indication formation indicating the target donor node to receive the rerouted data packets forwarded by the IAB node; or
wherein the information for the target donor node to forward the data comprises second indication information indicating the target donor node to forward the rerouted data packets to the source donor node.

5. A method of data packet transmission, comprising:
receiving, by a target donor node from a source donor node, a handover request message;
receiving, by the target donor node, rerouted data packets from an Integrated Access Backhaul (IAB) node; and
forwarding, by the target donor node to the source donor node, the rerouted data packets based on information in the handover request message for the target donor node to forward data;
wherein the information for the target donor node to forward the data comprises Transport Network Layer (TNL) information of an F1-U interface,
the TNL information comprises a transport layer IP address,
the transport layer IP address is an IP address of the IAB node, and
the transport layer IP address is allocated by the source donor node.

6. The method of claim 5, wherein the information for the target donor node to forward the data comprises forwarding tunnel information of an Xn-U interface,
the forwarding tunnel information meets at least one of the following:
if granularity of the forwarding tunnel information is UE-DRBs, the forwarding tunnel information comprises a transport layer IP address, a GTP-TEID and a DRB identifier,
if the granularity of the forwarding tunnel information is F-1-U IPs, the forwarding tunnel information comprises a transport layer IP address and a GTP-TEID, and
if the granularity of the forwarding tunnel information is gNBs, the forwarding tunnel information comprises a transport layer IP address and a GTP-TEID.

7. The method of claim 5, wherein the information for the target donor node to forward the data comprises an IP routing forwarding indication message and a routing forwarding table; or
wherein the information for the target donor node to forward the data comprises a Backhaul Adaption Protocol (BAP) address of the source donor node.

8. The method of claim 5, wherein the information for the target donor node to forward the data comprises first indication information indicating the target donor node to receive rerouted data packets forwarded by the IAB node, and
wherein receiving the handover request message transmitted by the source donor node and the rerouted data packets forwarded by the IAB node comprises: in response to receiving the first indication information, receiving the rerouted data packets forwarded by the IAB node.

9. The method of claim 8, further comprising:
configuring a routing table of IAB nodes along a target path through which the rerouted data packets pass and a routing table of the target donor node;
wherein each of the routing table of the IAB nodes and the routing table of the target donor node comprises a BAP address of the source donor node and a BAP address of a corresponding next hop node.

10. The method of claim 5, wherein the information for the target donor node to forward the data comprises second indication information indicating the target donor node to forward the rerouted data packets to the source donor node, and wherein forwarding the rerouted data packets to the source donor node, based on the information in the handover request message for the target donor node to forward the data comprises:

in response to receiving the second indication information, forwarding the rerouted data packets to the source donor node.

11. A method of data packet transmission, comprising:

determining, by an Integrated Access Backhaul (IAB) node, rerouted data packets comprising data packets which have been transmitted by the IAB node to a next hop IAB node but for which no Radio Link Control Layer Protocol (RLC) acknowledgement feedback has been received from the next hop IAB node, and data packets having been subjected to RLC processing by the IAB node but having not been transmitted to the next hop IAB node; and transmitting, by the IAB node, the rerouted data packets to a target donor node according to information for the target donor node to forward data;

wherein the information for the target donor node to forward the data comprises Transport Network Layer (TNL) information of an F1-U interface, the TNL information comprises a transport layer IP address, the transport layer IP address is an IP address of the IAB node, and the transport layer IP address is allocated by a source donor node.

12. The method of claim 11, further comprising:

modifying a destination Backhaul Adaption Protocol (BAP) address of the rerouted data packets to be a BAP address of the target donor node.

13. An apparatus comprising one or more processors configured to cause the apparatus to implement a method, comprising:

transmit, by a source donor node to a target donor node, a handover request message comprising information for the target donor node to forward data; and receive, by the source donor node, rerouted data packets forwarded by the target donor node, wherein the rerouted data packets are sent from an Integrated Access Backhaul (IAB) node to the target donor node, and the rerouted data packets are forwarded by the target donor node based on the information in the handover request message for the target donor node to forward data, wherein the information for the target donor node to forward the data comprises Transport Network Layer (TNL) information of an F1-U interface, the TNL information comprises a transport layer IP address, the transport layer IP address is an IP address of the IAB node, and the transport layer IP address is allocated by a source donor node.

14. A non-transient computer readable storage medium having a computer program stored thereon, wherein the computer program, when executed by at least one processor, causing an apparatus to implement a method, comprising:

transmitting, by a source donor node to a target donor node, a handover request message comprising information for the target donor node to forward data; and receiving, by the source donor node, rerouted data packets forwarded by the target donor node, wherein the rerouted data packets are sent from an Integrated Access Backhaul (IAB) node to the target donor node, and the rerouted data packets are forwarded by the target donor node based on the information in the handover request message for the target donor node to forward data, wherein the information for the target donor node to forward the data comprises Transport Network Layer (TNL) information of an F1-U interface, the TNL information comprises a transport layer IP address, the transport layer IP address is an IP address of the IAB node, and the transport layer IP address is allocated by a source donor node.

15. An apparatus comprising one or more processors configured to cause the apparatus to implement a method, comprising:

receive, by a target donor node from a source donor node, a handover request message;

receive, by the target donor node, rerouted data packets from an Integrated Access Backhaul (IAB) node; and forward, by the target donor node to the source donor node, the rerouted data packets based on information in the handover request message for the target donor node to forward data;

wherein the information for the target donor node to forward the data comprises Transport Network Layer (TNL) information of an F1-U interface, the TNL information comprises a transport layer IP address, the transport layer IP address is an IP address of the IAB node, and the transport layer IP address is allocated by a source donor node.

16. An apparatus comprising one or more processors configured to cause the apparatus to implement a method, comprising:

determine, by an Integrated Access Backhaul (IAB) node, rerouted data packets comprising data packets which have been transmitted by the migrating IAB access node to a next hop IAB node but for which no Radio Link Control Layer Protocol (RLC) acknowledgement feedback has been received from the next hop IAB node, and data packets having been subjected to RLC processing by the IAB node but having not been transmitted to the next hop IAB node; and transmit, by the IAB node, the rerouted data packets to a target donor node according to information for the target donor node to forward data;

wherein the information for the target donor node to forward the data comprises Transport Network Layer (TNL) information of an F1-U interface, the TNL information comprises a transport layer IP address, the transport layer IP address is an IP address of the IAB node, and the transport layer IP address is allocated by a source donor node.

17. A non-transient computer readable storage medium having a computer program stored thereon, wherein the computer program, when executed by at least one processor, causing an apparatus to implement a method, comprising:

receiving, by a target donor node from a source donor node, a handover request message;

receiving, by the target donor node, rerouted data packets from an Integrated Access Backhaul (IAB) node; and forwarding, by the target donor node to the source donor node, the rerouted data packets based on information in the handover request message for the target donor node to forward data;

wherein the information for the target donor node to forward the data comprises Transport Network Layer (TNL) information of an F1-U interface, the TNL information comprises a transport layer IP address, the transport layer IP address is an IP address of the IAB node, and the transport layer IP address is allocated by a source donor node.

18. A non-transient computer readable storage medium having a computer program stored thereon, wherein the computer program, when executed by at least one processor, causing an apparatus to implement a method, comprising:

determining, by an Integrated Access Backhaul (IAB) node, rerouted data packets comprising data packets which have been transmitted by the IAB node to a next hop IAB node but for which no Radio Link Control Layer Protocol (RLC) acknowledgement feedback has been received from the next hop IAB node, and data packets having been subjected to RLC processing by the IAB node but having not been transmitted to the next hop IAB node; and transmitting, by the IAB node, the rerouted data packets to a target donor node according to information for the target donor node to forward data;

wherein the information for the target donor node to forward the data comprises Transport Network Layer (TNL) information of an F1-U interface, the TNL information comprises a transport layer IP address, the transport layer IP address is an IP address of the IAB node, and the transport layer IP address is allocated by a source donor node.

* * * * *